United States Patent
Chen et al.

(10) Patent No.: US 10,877,807 B2
(45) Date of Patent: Dec. 29, 2020

(54) METHOD, APPARATUS AND COMPUTER PROGRAM PRODUCT FOR ALLOCATING PROCESSING RESOURCE TO APPLICATION

(71) Applicant: EMC Ip Holding Company LLC, Hopkinton, MA (US)

(72) Inventors: Fei Chen, Beijing (CN); Layne Lin Peng, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 16/162,475

(22) Filed: Oct. 17, 2018

(65) Prior Publication Data
US 2019/0121674 A1    Apr. 25, 2019

(30) Foreign Application Priority Data
Oct. 20, 2017   (CN) .......................... 2017 1 0987028

(51) Int. Cl.
*G06F 9/46*     (2006.01)
*G06F 9/50*     (2006.01)
*G06F 8/51*     (2018.01)

(52) U.S. Cl.
CPC .............. *G06F 9/5033* (2013.01); *G06F 8/51* (2013.01); *G06F 2209/501* (2013.01); *G06F 2209/503* (2013.01)

(58) Field of Classification Search
CPC ................................................... G06F 9/5055
USPC ......................................................... 718/104
See application file for complete search history.

(56) References Cited

U.S. PATENT DOCUMENTS

| 7,228,354 | B2 * | 6/2007 | Chambliss | .......... G06F 11/1076 370/395.4 |
| 7,313,560 | B2 * | 12/2007 | Dilley, Jr. | ............. G06F 16/214 |
| 7,996,484 | B2 * | 8/2011 | Mundkur | ............ G06F 13/4022 709/213 |
| 8,200,771 | B2 * | 6/2012 | Ganesh | ................. G06F 9/4856 709/212 |
| 8,429,645 | B2 * | 4/2013 | Draper | ..................... G06F 8/34 717/177 |

(Continued)

FOREIGN PATENT DOCUMENTS

WO    WO-2018106772 A1 *    6/2018    ............... G06F 9/48

OTHER PUBLICATIONS

Andrei-Alexandru Dafinoiu; "Investigation of Heterogeneous Computing Through Novel Parallel Programming Platforms"; The University of Huddersfield—Sep. 2016.*

*Primary Examiner* — Francisco J Aponte
(74) *Attorney, Agent, or Firm* — Ryan, Mason & Lewis, LLP

(57) ABSTRACT

Embodiments of the present disclosure relate to a method and apparatus of allocating a processing resource to an application. The method comprises receiving from the application a request for executing a task. The method further comprises determining a characteristic of the application based on the request. The method may determine stored historical data associated with the application. In addition, the method may further automatically select, based on the characteristic of the application and the historical data, the processing resource applicable to the application for allocation to the application.

20 Claims, 7 Drawing Sheets

(56) References Cited

U.S. PATENT DOCUMENTS

| | | | | |
|---|---|---|---|---|
| 8,688,628 B2* | 4/2014 | Riemers | G06F 9/466 | 707/609 |
| 8,782,645 B2* | 7/2014 | Breternitz | G06F 9/5083 | 718/100 |
| 8,869,136 B2* | 10/2014 | Chapman | G06F 8/77 | 717/174 |
| 8,924,564 B2* | 12/2014 | Lublin | G06F 15/16 | 709/226 |
| 8,990,527 B1* | 3/2015 | Linstead | G06F 3/0617 | 711/161 |
| 9,118,520 B1* | 8/2015 | Mao | G06F 11/3409 | |
| 9,141,625 B1* | 9/2015 | Thornewell | G06F 16/119 | |
| 9,294,097 B1* | 3/2016 | Vassiliev | H03K 19/17704 | |
| 9,317,338 B2* | 4/2016 | Wong | G06F 9/5077 | |
| 9,531,805 B1* | 12/2016 | Brown | H04L 67/1091 | |
| 9,690,632 B2* | 6/2017 | Wong | G06F 9/5016 | |
| 9,703,585 B2* | 7/2017 | Bercovici | G06F 9/4856 | |
| 9,830,678 B2* | 11/2017 | Gandhi | G06T 1/20 | |
| 9,871,741 B2* | 1/2018 | Kurtzman | G06F 16/24578 | |
| 9,910,618 B1* | 3/2018 | Curley | G06F 3/0647 | |
| 10,069,758 B2* | 9/2018 | Harned | H04L 41/147 | |
| 10,169,065 B1* | 1/2019 | Nye | G06F 11/2025 | |
| 10,462,012 B1* | 10/2019 | Rao | G06F 16/214 | |
| 10,606,660 B1* | 3/2020 | Hartley | H04L 41/0896 | |
| 2003/0120778 A1* | 6/2003 | Chaboud | G06F 9/5011 | 709/225 |
| 2006/0048157 A1* | 3/2006 | Dawson | G06F 9/5072 | 718/104 |
| 2006/0149842 A1* | 7/2006 | Dawson | G06F 9/5072 | 709/226 |
| 2009/0070771 A1* | 3/2009 | Yuyitung | G06Q 10/06 | 718/105 |
| 2010/0131959 A1* | 5/2010 | Spiers | G06F 9/50 | 718/105 |
| 2010/0287560 A1* | 11/2010 | Neft | G06F 9/4856 | 718/104 |
| 2010/0325288 A1* | 12/2010 | Jagadish | G06F 9/54 | 709/227 |
| 2012/0066541 A1* | 3/2012 | Dournov | G06F 11/0709 | 714/3 |
| 2012/0110582 A1* | 5/2012 | Ferdous | G06F 9/5044 | 718/101 |
| 2012/0303799 A1* | 11/2012 | Hadas | G06F 9/4856 | 709/224 |
| 2013/0054734 A1* | 2/2013 | Bond | G06F 9/4856 | 709/217 |
| 2013/0166504 A1* | 6/2013 | Varkhedi | G06F 9/4856 | 707/610 |
| 2013/0227585 A1* | 8/2013 | Ichikawa | G06F 9/50 | 718/104 |
| 2014/0007059 A1* | 1/2014 | Stefansson | G06F 9/5072 | 717/140 |
| 2014/0068581 A1* | 3/2014 | Chen | G06F 8/451 | 717/149 |
| 2014/0082479 A1* | 3/2014 | Guinane | G06F 40/14 | 715/234 |
| 2014/0082616 A1* | 3/2014 | Kurita | G06F 9/455 | 718/1 |
| 2014/0325503 A1* | 10/2014 | Li | G06F 11/34 | 717/177 |
| 2015/0032986 A1* | 1/2015 | Moore | G06F 9/00 | 711/171 |
| 2015/0150019 A1* | 5/2015 | Sheaffer | G06F 9/5044 | 718/104 |
| 2015/0304243 A1* | 10/2015 | Jasperson, Jr. | H04L 47/808 | 709/225 |
| 2016/0004553 A1* | 1/2016 | Torii | G06F 9/4856 | 718/1 |
| 2016/0011913 A1* | 1/2016 | Novikov | G06F 9/5077 | 718/1 |
| 2016/0036923 A1* | 2/2016 | Phanishayee | G06F 9/4856 | 709/217 |
| 2016/0092266 A1* | 3/2016 | Bavishi | G06F 9/4856 | 718/1 |
| 2016/0110210 A1* | 4/2016 | Vecera | G06F 9/45558 | 718/1 |
| 2016/0112510 A1* | 4/2016 | Bai | H04L 67/1095 | 709/217 |
| 2016/0357473 A1* | 12/2016 | Kim | G06F 12/0223 | |
| 2016/0371081 A1* | 12/2016 | Powers | G06F 9/45504 | |
| 2017/0005990 A1* | 1/2017 | Birger | H04L 63/045 | |
| 2017/0012854 A1* | 1/2017 | Balasubramanian | G06F 9/5072 | |
| 2017/0139729 A1* | 5/2017 | Cropper | G06F 9/4881 | |
| 2017/0242779 A1* | 8/2017 | Alger | G06F 9/44505 | |
| 2017/0244788 A1* | 8/2017 | Bai | H04L 67/1095 | |
| 2017/0262567 A1* | 9/2017 | Vassiliev | H03K 19/17736 | |
| 2017/0364387 A1* | 12/2017 | Ahmed | G06F 9/4856 | |
| 2018/0060120 A1* | 3/2018 | Nassi | G06F 9/30123 | |
| 2018/0123973 A1* | 5/2018 | Nasser | G06F 9/50 | |
| 2018/0217868 A1* | 8/2018 | Golas | G06F 9/5022 | |
| 2018/0239555 A1* | 8/2018 | Cao | G06F 3/0647 | |
| 2018/0349199 A1* | 12/2018 | Vyas | G06F 11/3003 | |
| 2019/0034226 A1* | 1/2019 | Gao | H04L 61/6009 | |
| 2019/0056942 A1* | 2/2019 | Chen | G06F 15/82 | |
| 2020/0034167 A1* | 1/2020 | Parthasarathy | G06F 9/45558 | |

\* cited by examiner

METHOD, APPARATUS AND COMPUTER PROGRAM PRODUCT FOR ALLOCATING PROCESSING RESOURCE TO APPLICATION

RELATED APPLICATIONS

This application claims priority from Chinese Patent Application Number CN201710987028.2, filed on Oct. 20, 2017 at the State Intellectual Property Office, China, titled "METHOD, APPARATUS AND COMPUTER PROGRAM PRODUCT FOR ALLOCATING A PROCESSING RESOURCE FOR AN APPLICATION" the contents of which are incorporated by reference herein in their entirety.

FIELD

Embodiments of the present disclosure generally relate to allocation of a processing resource for an application, and specifically to a method, apparatus and computer program product for automatically allocating a processing resource to an application based on historical data.

BACKGROUND

Today, processing resources such as a Graphics Processing Unit (GPU) and a Field Programmable Gate Array (FPGA) have been widely used to accelerate many applications, like machine learning, deep learning, encryption and so on. An application can be accelerated by a GPU or FPGA, so users want to run their applications using a GPU and/or FPGA. Usually, GPU and FPGA cards need to be installed locally on a machine, to allow the users to manually select to run the application with a GPU or FPGA. On the other hand, lots of today's datacenters or cloud service providers deploy different processing resources for users to run their applications. A cross-hardware platform programming language such as OpenCL further enables the same application to be run on different processing resources, for example, to be run on both a GPU and FPGA.

SUMMARY

Embodiments of the present disclosure provide a method and apparatus of allocating a processing resource to an application.

According to a first aspect of the present disclosure, there is provided a method of allocating a processing resource to an application. The method comprises receiving from the application a request for executing a task. The method further comprises determining a characteristic of the application based on the request. The method may determine stored historical data associated with the application. In addition, the method may further automatically select, based on the characteristic of the application and the historical data, the processing resource applicable to the application for allocation to the application.

According to a second aspect of the present disclosure, there is provided an electronic device. The electronic device comprises: at least one processing unit and at least one memory. The at least one memory is coupled to the at least one processing unit and stores instructions executable by the at least one processing unit. The instructions, when executed by the at least one processing unit, cause the electronic device to: receive from an application a request for executing a task; determine a characteristic of the application based on the request; determine stored historical data associated with the application; and automatically select, based on the characteristic of the application and the historical data, a processing resource applicable to the application for allocation to the application.

According to a third aspect of the present disclosure, there is provided a computer program product being tangibly stored on a non-transitory computer-readable medium and comprising machine-executable instructions. The machine-executable instructions, when executed, cause a machine to perform any step of the method described according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent from more detailed description of exemplary embodiments of the present disclosure with reference to the accompanying drawings, in which the same reference symbols generally refer to the same elements in exemplary embodiments of the present disclosure.

DETAILED DESCRIPTION OF EMBODIMENTS

Figure 1:
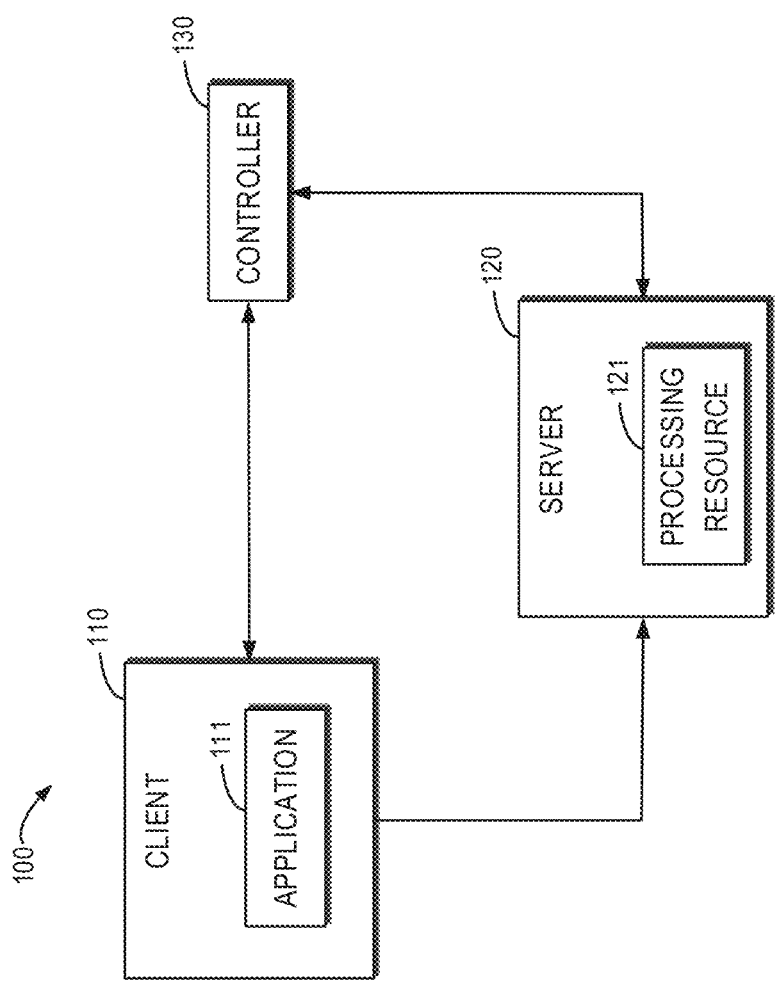
FIG. 1 illustrates a schematic diagram of an architecture of allocating a processing resource to an application according to an embodiment of the present disclosure.

Preferred embodiments of the present disclosure will be described below in greater detail with reference to the drawings. Although preferred embodiments of the present disclosure are illustrated in the drawings, it is to be understood that the present disclosure can be implemented in various manners, not limited to the embodiments illustrated herein. Rather, these embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

For ease of description, embodiments of the present disclosure will be described below mainly by taking the GPU and FPGA as examples of a processing resource. However, it should be appreciated that the processing resource mentioned herein further comprises other dedicated or general purpose processing resources such as General Purpose Graphics Processing Unit (GPGPU) and Central Processing Unit (CPU), no matter whether they are currently known or to be developed in the future.

In addition, for ease of description, embodiments of the present disclosure will be described below mainly by taking OpenCL as an example of a cross-hardware platform programming language. However, it should be appreciated that the embodiments of the present disclosure may also be adapted for other cross-hardware platform programming languages, no matter whether they are currently known or to be developed in the future.

Conventionally, the users themselves choose to run their applications on which kinds types of processing resources based on the application type, the price of cloud service and the accelerator library they have. The processing resources are statically mapped to user applications when the applications are deployed. For example, eight FPGA devices are statically allocated to a user's first application and other four GPU devices are statically allocated to the user's second application. Such processing resource allocation is manually and statically done in today's datacenter and cloud. However, the manual or static allocation method can hardly achieve optimized resource utilization in today's datacenter and cloud environment because processing resources are shared and applications are dynamically changing.

GPU and FPGA are widely used in today's datacenters and clouds because they provide very good performance and power efficiency compared to a general purpose CPU architecture. Traditionally, GPU and FPGA have different types of programming languages and programming models, so an application can only be designed for and run on one of GPU and FPGA. Today, a cross-hardware platform programming language such as OpenCL becomes a popular programming language and programming model. OpenCL programming language is an open source, and hardware independent by which both GPU and FPGA can be programmed by the same application program interface (API) standard. Usually, developers develop the accelerator source code as the OpenCL Kernel code, and the OpenCL Kernel code can be compiled into OpenCL Kernel binary code for GPU and FPGA respectively. An application uses the same API standard to interact with either GPU or FPGA.

However, even with the same OpenCL programming model, the OpenCL Kernel binary code is still different and non-compatible for GPU and FPGA. It means OpenCL Kernel binary code for GPU can't run on FPGA, and vice versa. Even if the user compiles the same OpenCL Kernel code twice to get two sets of binary code for GPU and FPGA respectively, the user still has to manually and statically choose the GPU or FPGA devices to run the application.

In addition, an application can be accelerated by both GPU and FPGA, so users want to run their applications with GPU and/or FPGA. Nowadays, most big datacenters and clouds provide both GPU and FPGA devices to their users, allowing users to run applications with GPU or FPGA. In a lot of cases, it is really difficult to make a choice between GPU and FPGA when both of them are available. It is because GPU and FPGA provide different kinds of advantages to an application and a system on which the application runs. For example, GPU performs better than FPGA for the image processing workload, while FPGA performs better than GPU for compression/decompression workload. In addition, FPGA has more power efficiency than GPU. The datacenter or cloud charges a user much more money when the user chooses a GPU device because the GPU device has a higher price and consumes more energy. With a static device allocation method, it is hard to achieve high performance and high efficiency for the user and the datacenter or cloud.

The overall optimization goal when running an application can be different, such as the faster the better, the lower cost the better, the lower power consumption the better, the higher resource efficiency the better, and across the above targets. It is very difficult for a static GPU/FPGA resource allocation for an application to meet the requirements. Especially when in a shared and dynamically changing environment like a public cloud, it is not possible to flexibly achieve these targets, and changes between these targets, by either a user or today's datacenter and cloud based on a traditional GPU/FPGA device allocation method.

Embodiments of the present disclosure construct a unified resource pool with different types of processing resources such as FPGA and GPU devices, and allocate a processing resource to an application using the cross-hardware platform programming languages dynamically and transparently. Through embodiments of the present disclosure, the resource pool provides OpenCL Kernel binary code compatibility to the application at the macro level. Embodiments of the present disclosure may automatically schedule different types of processing resources for the application. The user doesn't need to manually assign FPGA or GPU to the application, and the application will be transparently allocated with either FPGA or GPU devices from the resource pool, and then run on the allocated processing resources.

It will be appreciated through the following depictions that embodiments of the present disclosure are advantageous in automatically scheduling a processing resource for an application, and meanwhile implementing optimization of resource utilization. Through an embodiment of the present disclosure, an application may be dynamically and transparently allocated with different types of processing resources, and then run on the allocated processing resources, thereby macroscopically implementing compatibility of different types of processing resources.

FIG. 1 illustrates a schematic diagram of an architecture 100 of allocating a processing resource to an application according to an embodiment of the present disclosure. It is to be understood that the structure and function of the architecture 100 are described only for illustrative purposes instead of implying any limit to the scope of the present disclosure. Embodiments of the present disclosure can be embodied in different structures and/or functions.

As shown in FIG. 1, the architecture 100 may include a client 110, a server 120 and a controller 130. An application 111 is installed on the client 110. The application 111 is also called a host program, and it may be any application installed on the client 110, for example, image processing software, video processing software, human face recognition software, etc. A processing resource 121 such as GPU and FPGA devices is installed on the server 120. The controller 130 may be installed on a server. The server where the controller 130 lies may be the same as or different from the server 120 where the processing resource 121 lies. The client 110, server 120 and controller 130 may be connected to one another via a network (e.g., 40G/100G TCP/RDMA).

For example, the architecture 100 may be implemented in a datacenter or cloud environment.

Although FIG. 1 only shows a single application 111 on a single client 110 and a single processing resource 121 on a single sever 120, it should be appreciated that the architecture 100 may include a plurality of clients 110 and a plurality of servers 120, wherein one or more applications may be installed on each client, and one or more processing resources may be installed on each server. One or more processing resources in the architecture 100 can be regarded as being in a resource pool. The processing resources in the resource pool may be shared by different users and different applications in the datacenter or cloud environment via the network.

Figure 2:
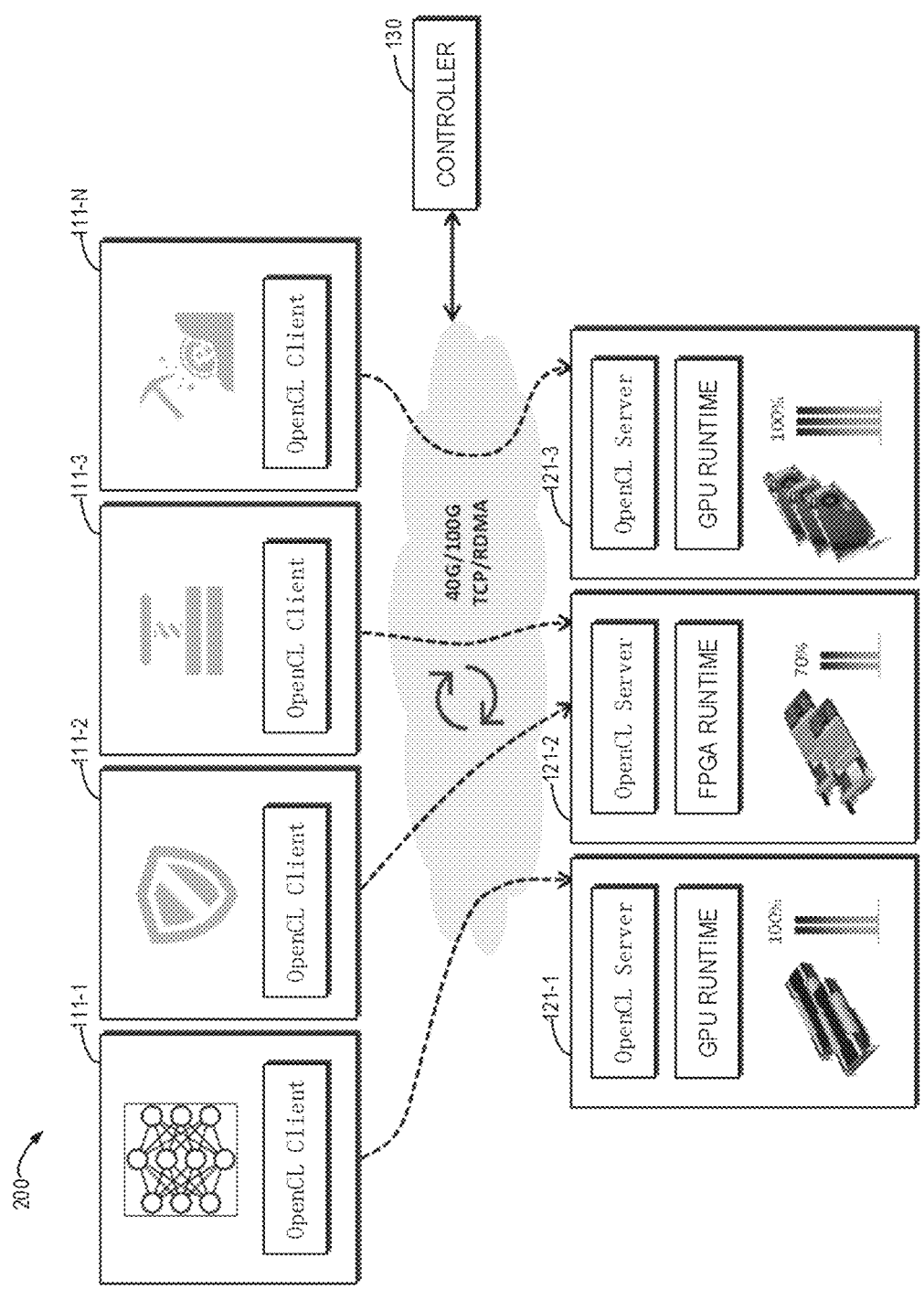
FIG. 2 illustrates a schematic diagram of another architecture of allocating a processing resource to an application according to an embodiment of the present disclosure.

FIG. 2 illustrates a schematic diagram of another architecture 200 of allocating a processing resource to an application according to an embodiment of the present disclosure. The other architecture 200 includes N applications respectively located at respective clients: a first application 111-1, a second application 111-2, a third application 111-3, and a Nth application 111-N, wherein N is a positive integer. It should be appreciated that for example the first application 111-1 may also represent a plurality of applications located at the same client. FIG. 2 shows a resource pool. As an example, the resource pool of the other architecture 200 includes three processing resources: a first GPU processing resource 121-1, a second FPGA processing resource 121-2 and a third GPU processing resource 121-3. It should be appreciated that for example the first GPU processing resource 121-1 may also represent a plurality of processing resources located at the same server. FIG. 2 further shows utilization rates of respective processing resources. In the example shown in FIG. 2, the current utilization rate of the first GPU processing resource 121-1 is 100%, the current utilization rate of the second FPGA processing resource 121-2 is 70%, and the current utilization rate of the third GPU processing resource 121-3 is 100%.

Referring to the GPUaaS (GPU as a service) project, GPU/FPGA hardware devices and the machines that run the user's applications are decoupled into different machines. That is, the GPU/FPGA devices to be used by the application needn't be locally located at the same machine as the application, but may be positioned remote to the application. As shown in FIG. 2, the GPU/FPGA OpenCL runtime library is decoupled into OpenCL client at the application and OpenCL server at the processing resource which are connected through high performance networking.

Returning to FIG. 1, when APIs happen in a client application, some early API calls are sent from the OpenCL client to the controller 130 to do application initialization. During this period, the controller 130 automatically provides the application with a list of available processing resources. Then, some following API calls are directly sent to the OpenCL server and executed in the machine with GPU/FPGA.

When the application 111 is launched, the controller 130 automatically provides on-demand allocation of processing resources to the application 111. Specifically, the controller 130 dynamically analyzes application requirements in the datacenter or cloud environment, and dynamically collects for example utilization rate of the processing resources in the resource pool. In response to a request from the application 111 for executing a task, the controller 130 generates a list of processing resources adapted for the application 111. Upon executing the task of the application 111, the controller 130 may convert code which is received from the application 111 and is specific to a certain resource type, to provide code compatibility to the application 111. In this way, hybrid processing resource allocation for an application may be implemented.

Figure 3:
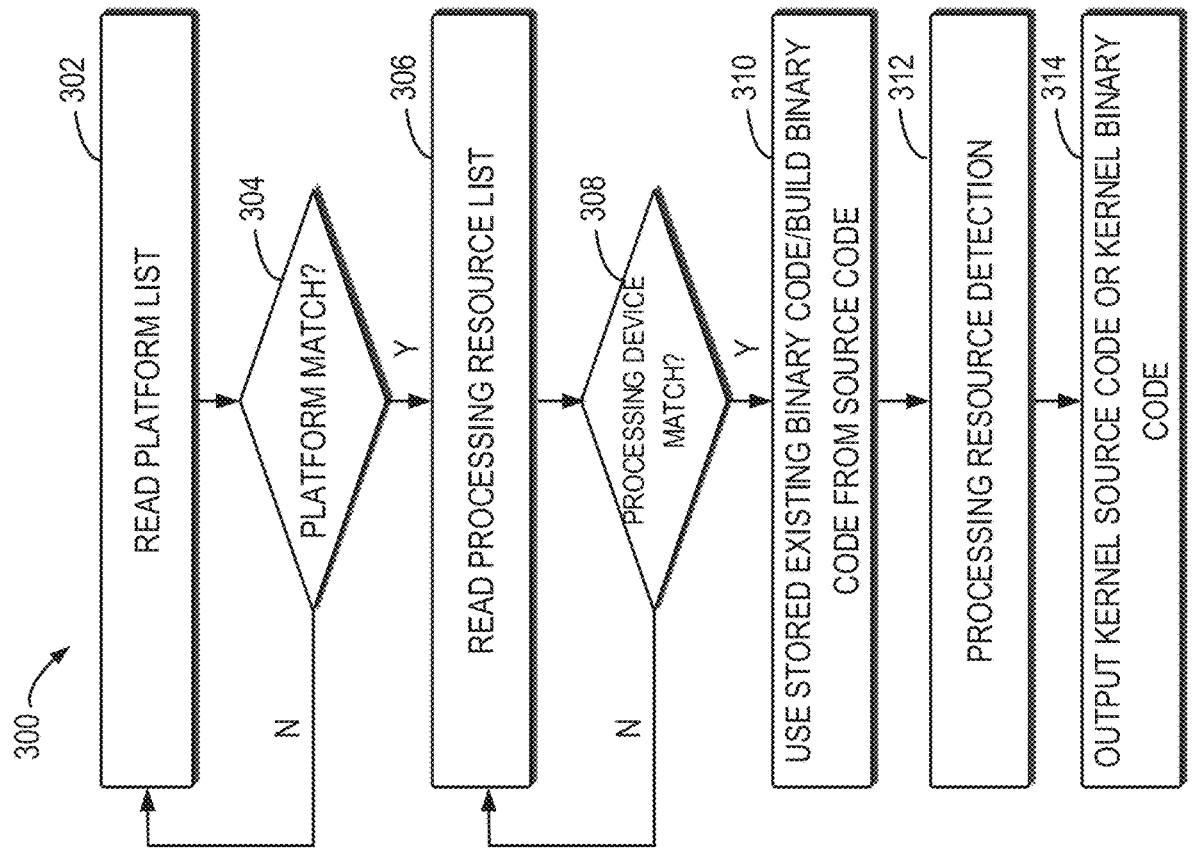
FIG. 3 illustrates a flowchart of an example launch process of an application.

FIG. 3 illustrates a flowchart of an example launch process 300 of the application 111. As shown in FIG. 3, at block 302, in response to the launch of the application 111, the application 111 may read an available platform list. The available platform list may be provided by the controller 130. At block 304, the application 111 may determine whether the available platform provided by the controller 130 is matched. If not matched, the example launch process 300 returns to block 302 to continue to read the available platform list. If the platform is matched, the application 111 reads an available processing resource list at block 306, and in response to this, the application 111 may send a request for executing a task to the controller 130. In response to receiving the available processing resource list provided by the controller 130, at block 308 the application 111 may determine whether the available processing resource provided by the controller 130 is matched. If not matched, the example launch process 300 returns to block 306 to continue to read the available processing resource list. If the processing resource is matched, at block 310 the application 111 searches for available OpenCL Kernel binary code stored on the client 110, or builds OpenCL Kernel binary code from the OpenCL Kernel source code. At block 312, the application 111 performs a processing resource detection. At block 314, the application 111 outputs the OpenCL Kernel source code or OpenCL Kernel binary code, to execute the task on the detected processing resource. In the embodiments of the present disclosure, the OpenCL Kernel source code or OpenCL Kernel binary code output by the application 111 will be intercepted by the controller 130.

Figure 4:
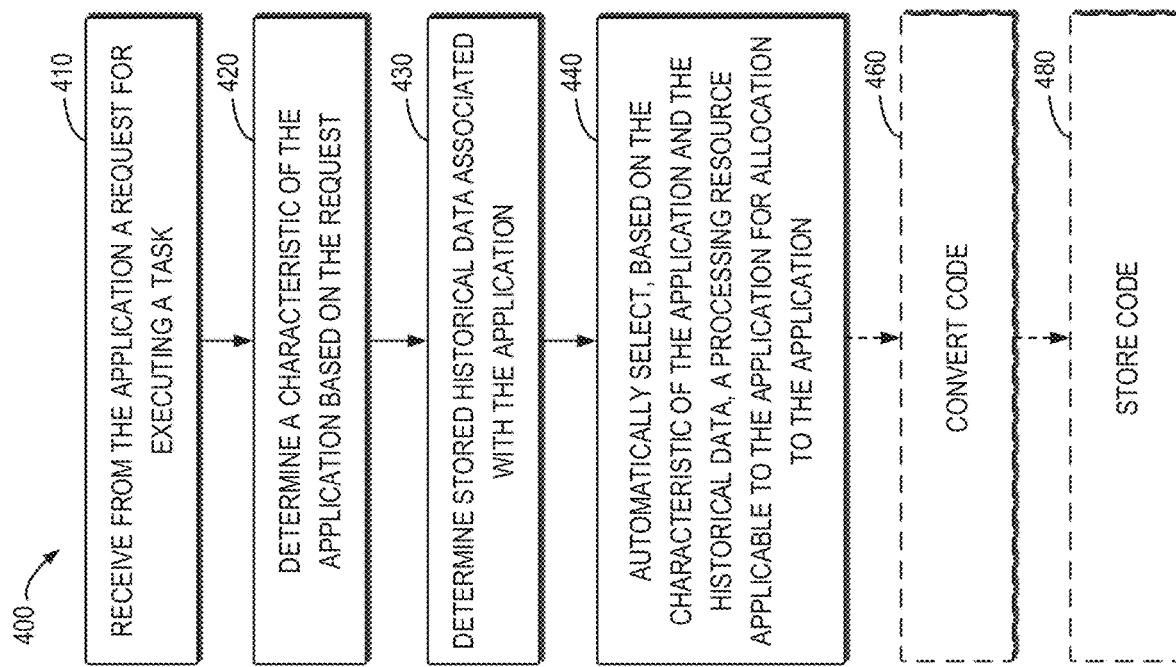
FIG. 4 illustrates a flowchart of a method of allocating a processing resource to an application according to an embodiment of the present disclosure.

FIG. 4 illustrates a flowchart of a method 400 of allocating a processing resource to an application according to an embodiment of the present disclosure. For example, the method 400 can be implemented by the controller 130 shown in FIG. 1. It should be appreciated that the method 400 may further include additional blocks not shown and/or omit some blocks as shown. The scope of the present disclosure is not limited in this regard.

At block 410, the controller 130 receives from the application 111 a request for executing a task. When the user launches the application 111 in the datacenter or cloud, the application 111 may send the request for executing the task to the controller 130, to query for available processing resources. For example, the application 111 sends the request to the controller 130 to obtain processing resources for executing possible image processing tasks. As shown in the above FIG. 3, an application may send the request at block 306 of the initialization phase.

For an application using OpenCL programming language, the application uses two application program interfaces, APIs, (clGetPlatformIDs and clGetDeviceIDs) to obtain the list of available processing resources such as GPU and FPGA. In embodiments of the present disclosure, the two APIs are redirected to the controller 130 so that the controller 130 may receive the request from the application 111.

Figure 5:
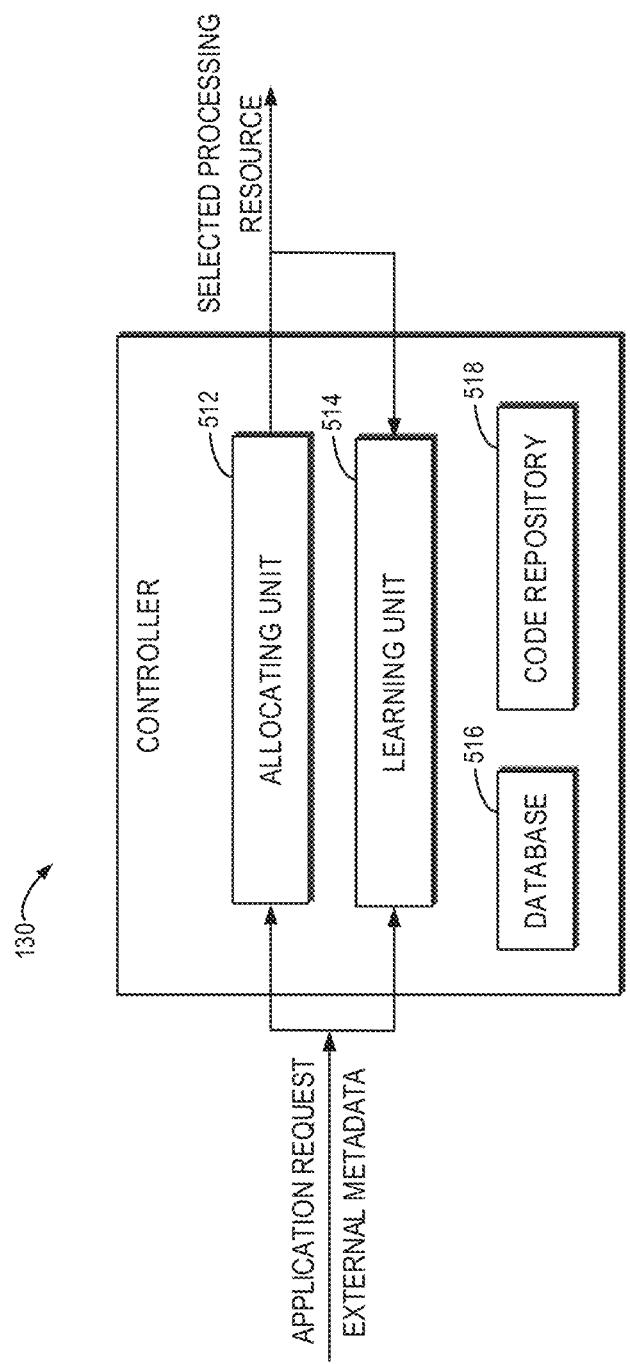
FIG. 5 illustrates a schematic diagram of an example structure of a controller according to an embodiment of the present disclosure.

In addition, only for ease of description of the method 400, FIG. 5 illustrates a schematic diagram of an example structure of the controller 130 according to an embodiment of the present disclosure.

The example structure of the controller 130 shown in FIG. 5 includes an allocating unit 512, a learning unit 514, a database 516 and a code repository 518. The allocating unit 512 is mainly configured to allocate a processing resource to an application. The learning unit 514 is configured to store information associated with an application in the database 516 or code repository 518, to perform machine learning. The database 516 may store metadata associated with an application. The code repository 518 may store code used by an application to execute a task, for example OpenCL Kernel source code and OpenCL Kernel binary code.

For the sake of clarity, FIG. 5 does not show some optional units of the controller 130. However, it should be appreciated that various features described herein are likewise applicable to the controller 130. In addition, it is noted that although FIG. 5 provides an example structure of the controller 130, this does not mean limiting embodiments of the present disclosure in any manner. Any general purpose processor may be used to implement the controller 130, no matter whether it is currently known or to be developed in the future, and no matter whether it abides by what kinds of processor architectures and/or instruction protocols.

Other acts of the method 400 will be described below with reference to FIG. 5.

At block 420 of the method 400, the controller 130 determines a characteristic of the application 111 based on the request from the application 111. The request from the application 111 may be associated with metadata. These associated metadata indicate the characteristic of the application 111.

Some metadata indicating the characteristic of the application 111 may be directly input by the user. In the datacenter or cloud, the user may use some metadata to launch the application 111. For example, upon launching a new application 111, the user may input a preferred processing device type on the client 110. Hence, when the application 111 sends the request (clGetPlatformIDs and clGetDeviceIDs calls) to the controller 130, the controller 130 may receive the metadata from the application 111. Here, the metadata received by the controller 130 from the application 111 is called external metadata. The external metadata may be stored by the learning unit 514 of the controller 130 in the database 516 of the controller 130.

Some metadata indicating the characteristic of the application 111 may be inferred from the external metadata, or queried for in the database 516 of the controller 130 based on the external metadata. The metadata obtained by inference or query is called internal metadata herein. For example, the internal metadata may be information associated with the user's account such as quota. As an example of inferring the internal metadata, if the external metadata indicates that a given application is based on a known framework such as TensorFlow, it may be inferred that GPU is preferred to the application. If a given application is based on a Hadoop framework in the Operating System (OS) image, it may be inferred that compression/decompression accelerator may be used in the application. The internal metadata may also be stored by the learning unit 514 of the controller 130 in the database 516 of the controller 130.

Based on the external metadata and internal metadata, the controller 130 may determine the characteristic of the application 111. For example, the characteristic of the application 111 may include: application name, OS image, special framework or library to be used by the application, accelerator/OpenCL Kernel preferred by the application, application optimization target (such as performance, power efficiency, cost and so on), user account of the application, quota for the user account in the datacenter or cloud, processing device type (e.g., GPU or FPGA) preferred by user, etc. Since the external metadata contains the application's requirement information for the processing resources, embodiments of the present disclosure can always find a valid processing resource for a user application.

At block 430 of the method 400, the controller 130 determines stored historical data associated with the application 111. The historical data refer to data of previous applications. The historical data may be obtained from a historical profile in the datacenter and cloud. The historical data may be stored at the controller 130. Specifically, the historical data may include metadata of previous applications in the database 516 of the controller 130 and code used by previous applications in the code repository 518.

For example, the database 516 may maintain the following information entries: {application name: framework}, {application name: target for low cost}, {OS image name: GPU only}, {user name: FPGA only}, {application name: OpenCL Kernel name} and so on. The controller 130 may search for, based on the above external and/or internal metadata, information (namely, historical information) of previous applications identical to the application 111 in the database 516, for example, device types used by the previous applications, time spent by a certain device in executing the task, etc. Information such as previous application framework, OS image name and so on in the database 516 may be used to determine a sameness degree of the previous applications and the current application. The sameness degree may be further used to determine a reference value of the device type used by the previous applications.

At block 440 of the method 400, based on the characteristic of the application 111 and the historical data, the allocating unit 512 of the controller 130 automatically selects the processing resource 121 applicable to the application 111 for allocation to the application 111. As stated above, the external or internal metadata and information of previous applications may help the allocating unit 512 to allocate the processing resource to the application. The application 111 and the processing resource 121 may be positioned remote to each other. In this way, the metadata may be used to infer whether the GPU and/or FPGA may be used to run the application.

As an example, assuming the historical data indicate that a previous application identical to the application 111 spends one minute in executing the task with the GPU device, and another previous application identical to the application 111 spends three minutes in executing the task with the FPGA device, then the controller 130 will preferably select and allocate the GPU to the application 111.

The controller 130 may determine, based on the historical data, whether there is stored code that has been determined as being applicable to the application 111. In response to finding the code applicable to the application 111, the controller 130 may determine a resource type applicable to the application 111 based on the code. The controller 130 may select the processing resource based on the determined resource type.

As stated above, the historical data may include code used by the previous applications in the code repository 518 of the controller 130. The code repository 518 may contain a set of OpenCL Kernel source code or OpenCL Kernel binary code. Hence, the accelerator or OpenCL Kernel in the code repository 518 may be GPU only, FPGA only and GPU/FPGA common. Some commonly-used OpenCL Kernels may be pre-stored in the code repository 518. For example, libz which is widely used in Linux system for compression/decompression and FFT accelerator which is widely used in visual application may be pre-stored. As described below in more detail, the code repository 518 may further be constantly updated in runtime. More OpenCL kernels from the applications will be added into this code repository 518.

The external metadata, internal metadata and historical data described above may be combined to be sent to the code repository 518 to search for code (also called equivalent code) applicable to the application 111. Thereby, the controller 130 may determine whether there is stored a previous application identical to the application 111 and code used by the previous application. For example, the previous applications may have the same name as the application 111. Since the application 111 is identical to the previous application, the application 111 probably uses, upon subsequently performing the task, the code used by the previous application. Therefore, if the code of the previous application identical to application 111 is found, the controller 130 may determine that the code used by the previous application is applicable to the application 111. Further, if the code is specific to GPU, the controller 130 may determine that the resource type applicable to the application 111 is GPU. Then, the controller 130 may select available GPU from the resource pool for allocation to the application 111. If the code is applicable to both the GPU and FPGA or equivalent code applicable to both the GPU and FPGA is stored, two resource types (GPU and FPGA) may be selected from the resource pool.

As an example, if the characteristic of the application indicates GPU and equivalent FPGA code exists in the code repository 518, two resource types (GPU and FPGA) may be selected. If the controller 130 determines that code that has been determined as being applicable to the application 111 is not stored, the output of the code repository 518 may be the processing resource type indicated by the characteristic of the application.

According to an example, determining whether there is stored code that has been determined as being applicable to the application 111 may be based on the number of code used by the previous applications identical to the application 111. In the case that the number is larger than a threshold, the controller 130 may determine that there is stored code that has been determined as being applicable to the application 111. In this way, reliability of the method 400 may be ensured.

The controller 130 may determine respective performance of available processing resources, and automatically select the processing resource further based on the respective performance of the available processing resources. In a server machine with GPU/FPGA device, there may be a service running as OpenCL Server. An agent module in OpenCL Server may dynamically collect FPGA/GPU local static information and runtime information, and then report the collected information to the controller 130. The collected information may be stored in a database of the controller 130 for scheduling the processing resources.

The static information of the processing resources may include the type of device, the vendor name, platform name, version name, device support features, and so on. This information may be used to determine whether an OpenCL Kernel binary code can run on the processing resource and which configurations can be applied to the processing device.

The runtime information of the processing resources may include how many applications are sharing the same processing resource, what is the processing resource utilization rate for each application which is sharing the processing resources (namely, business degree of the processing resources), what kind of OpenCL Kernel is used by the application, and so on.

These static information and runtime information may be used for the controller 130 to make a decision on how to allocate GPU/FPGA devices when an application is launched in a datacenter and cloud. For example, the controller may allocate the processing resources by scoring the processing resources in the resource pool.

Based on the characteristic of the application, historical data and the performance of the available processing resources, the allocating unit 512 of the controller 130 may determine available processing resources, thereby making a final optimized allocation.

Assuming that the processing resource selected by the controller 130 is of a first resource type, the controller 130 may, in response to receiving code applicable to the first resource type from the application 111, directly forward the code to the selected processing resource.

At optional block 460 of the method 400, the controller 130 may convert the code received from the application 111. Assuming that the processing resource selected by the controller 130 is of the first resource type, the controller 130 may, in response to receiving code (referred to as first code) specific to a second resource type from the application 111, convert the first code into another code (referred to as second code), wherein the second code is applicable to the selected first resource type. The controller 130 may send the second code to the selected processing resource for execution. As stated above, at runtime, the accelerator or OpenCL Kernel in the code repository 516 of the controller 130 may serve as the second code to replace the OpenCL Kernel of the application. Hence, if the code repository 516 includes equivalent OpenCL Kernel applicable to FPGA, the GPU application may be executed on the FPGA device. In this way, the code repository 516 is used to provide a possible OpenCL Kernel replacement when the application runs. Hence, it is possible to implement compatibility for different types of processing resources, or compatibility for code applicable to different types of processing resources.

For example, assuming that the application 111 provides GPU-specific OpenCL Kernel binary code to the controller 130, the controller 130 may replace the received code with OpenCL Kernel binary code that is stored by it and applicable to the FPGA, and then send the OpenCL Kernel binary code applicable to the FPGA to the FPGA device, thereby achieving the following effect: the application 111 providing the GPU-specific OpenCL Kernel binary code may use the FPGA device to execute the task.

As another alternative manner of converting the code, the controller 130 may compile the first code received from the application 111 into the second code, for use in the selected first resource type.

At optional block 480 of the method 400, the controller 130 may store the code received from the application 111. In response to receiving code (referred to as third code) from the application 111, the controller 130 determines that the third code is executable by the selected processing resource. In response to determining that the third code is executable by the selected processing resource, the controller 130 stores the third code in the database 516 in association with the characteristic of the application 111 and the selected processing resource, as historical data. In this way, data in the database 516 of the controller 130 is updated constantly, thereby achieving an effect of machine learning.

If it is determined that the third code includes general-purpose source code like the OpenCL Kernel source code, the controller 130 generates a plurality of sets of code applicable to different types of processing resources based on the general-purpose source code, and stores the plurality of sets of code. In this way, application runtime OpenCL Kernel is dynamically updated to the controller 130's database 516 and code repository 518 for another new iteration.

A specific API is used below to describe a specific example. After an application gets a list of processing resources provided by the controller 130, the application may use clCreateProgramWithSource and/or clCreateProgramWithBinary to get the handler of accelerator program applicable to the selected processing resource. Then, the application uses API clCreateKernel and/or clCreateKernelsInProgram to get the handler of an OpenCL Kernel function. All these APIs are redirected to the controller 130 first before they are sent to the allocated machine with the processing resource. The controller 130 may take the following operations:

When the controller 130 receives clCreateProgramWithSource, it may be determined that what is received by the controller 130 is the OpenCL Kernel source code. The controller 130 may use a compiler to generate OpenCL Kernel binary code for GPU and FPGA respectively. The controller 130 may add the received OpenCL Kernel source code and the generated binary code to the code repository 518.

After the controller 130 receives clCreateProgramWithBinary (it may be determined that what is received by the controller 130 is the OpenCL Kernel binary code) or after the binary code is generated from the source code as stated above, a search is performed in the code repository 518 to find an equivalent binary code for replacing the binary code of the application according to the allocated target processing resource type.

When the controller 130 receives clCreateKernel and/or clCreateKernelsInProgram, a "Kernel Name" and "binary code" relationship is obtained from these APIs. Such a relationship is updated in the database 516 of the controller 130 as new metadata entries to help future processing resource allocation (namely, as historical data for later applications).

After potential replacement of the OpenCL Kernel source code and binary code obtained above, the API of the application is sent to the machine with GPU/FPGA card. The OpenCL Server at the machine may execute the API on top of GPU/FPGA vendor's environment.

As embodiments of the present disclosure are implemented in scenarios of the datacenter or cloud, a lot of applications are executed in iterations, and some well-known frameworks or libraries are used. By using the embodiments of the present disclosure, the controller 130 will have plenty of metadata and OpenCL Kernel. Therefore, upon executing the task of the application, the controller 130 may convert user application's OpenCL Kernel, so as to provide a high likelihood of binary code compatibility.

Figure 6:
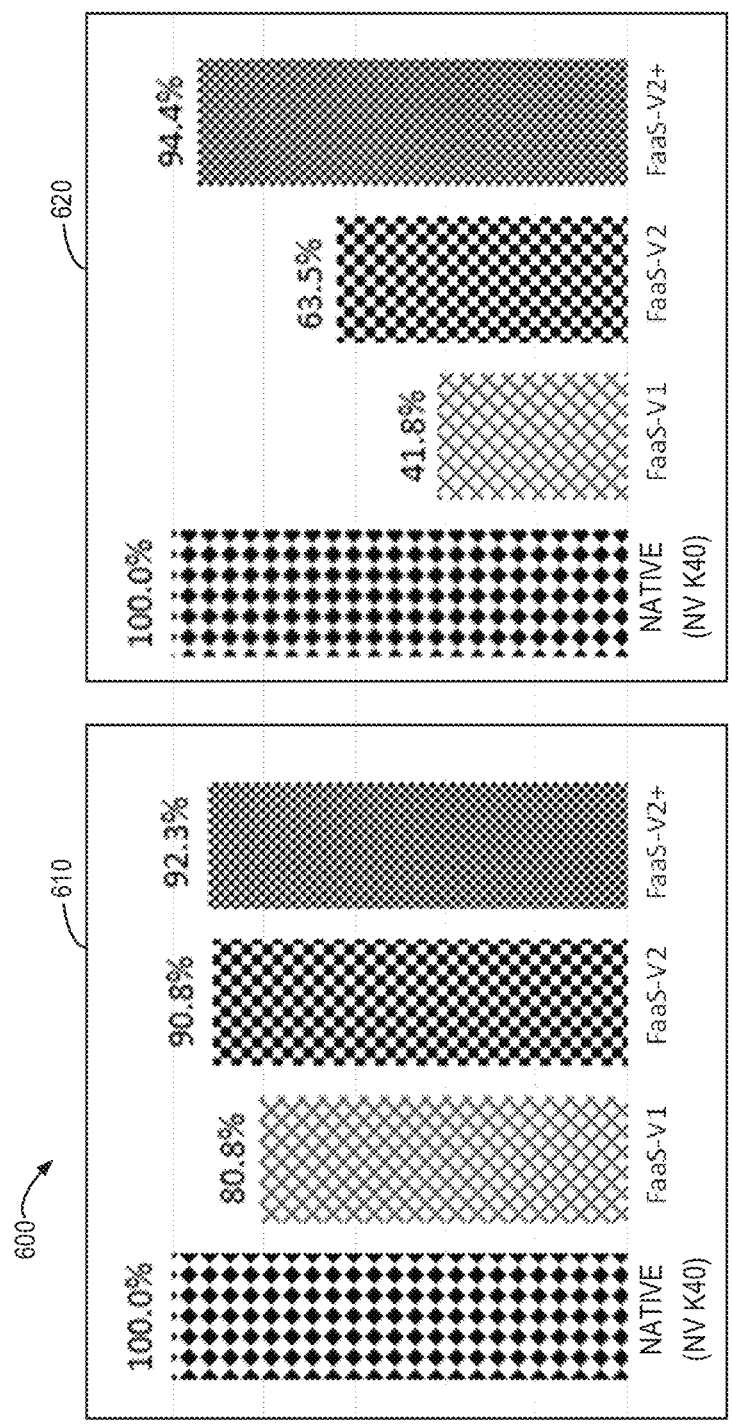
FIG. 6 illustrates a schematic diagram of a performance result for implementing the method of the present disclosure on a demo system.

FIG. 6 illustrates a schematic diagram of a performance result 600 for implementing the method 300 of the present disclosure on a demo system. The demo system is implemented to verify the technical solution of the present disclosure and obtain a preliminary performance result on some applications. A portion 610 in the performance result 600 represents a result of an OpenCV library for face recognition applications, and a portion 620 represents a result of Caffe-OpenCL for Cifar10 training applications. After optimization of three versions FaaS-V1, FaaS-V2 and FaaS-V2+, the hybrid resource pool reaches more than 90% performance of the case when running applications with a native device of the same kind.

Figure 7:
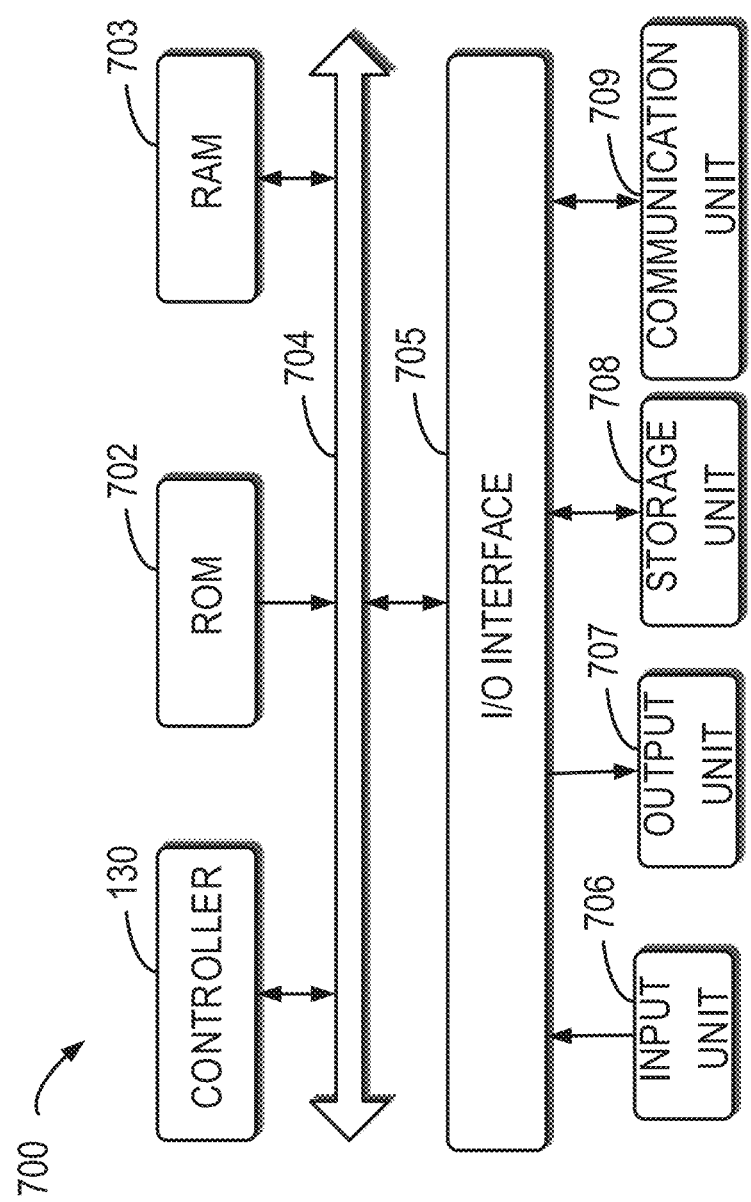
FIG. 7 illustrates a schematic block diagram of an example device that may be used to implement embodiments of the present disclosure.

FIG. 7 illustrates a schematic block diagram of an example device 700 that may be used to implement embodiments of the present disclosure. As shown in the figure, the device 700 includes a controller 130 which can perform various appropriate actions and processes based on computer program instructions stored in a read-only memory (ROM) 702 or computer program instructions loaded from a storage unit 708 to a random access memory (RAM) 703. In RAM 703, there are also stored various programs and data required by the device 700 when operating. The controller 130, ROM 702 and RAM 703 are connected to one another via a bus 704. An input/output (I/O) interface 705 is also connected to the bus 704.

A plurality of components of the device 700 are connected to the I/O interface 705, including: an input unit 706 comprising a keyboard, a mouse, and the like; an output unit 707, such as various types of displays, loudspeakers, and the like; a storage unit 708 including a magnetic disk, an optical disk, and the like; and a communication unit 709 including a LAN card, a modem, a wireless communication transceiver and so on. The communication unit 709 allows the device 700 to exchange information/data with other devices via a computer network, such as the Internet, and/or various telecommunications networks.

The above-described procedures and processes, such as the method 400, can be implemented by the controller 130 in FIG. 7. For example, in some embodiments, the method 400 can be implemented as a computer software program which is tangibly embodied on a machine-readable medium, for example, the storage unit 708. In some embodiments, part or all of the computer program can be loaded to and/or installed on the device 700 via the ROM 702 and/or the communication unit 709. The computer program, when loaded to the RAM 703 and executed by the controller 130, may execute one or more acts of the method 400 as described above. Alternatively, the controller 130 can also be configured to implement the method 400 as described above in any other proper manner (for example, by means of firmware).

It is noted that although above FIG. 5 provides an example structure of the controller 130, this does not mean limiting embodiments of the present disclosure in any manner. Any general-purpose processor may be used to implement the controller 130, no matter whether it is currently known or to be developed in the future, and no matter whether it abides by what kind of processor architectures and/or instruction protocols.

In the present disclosure, there are provided a method of constructing a unified resource pool with different types of processing resources (e.g., GPU and FPGA devices) and a method of allocating a processing resource to an application dynamically and transparently. With the embodiments of the present disclosure, a user does not need to manually assign a processing resource to an application, and the application will be transparently allocated with any type of processing resources from the resource pool, and then run on the allocated processing resources.

With the embodiments of the present disclosure, an application may be located on some machines without local processing resources. The controller 130 as shown in FIG. 1 may function as a processing resource allocator to find suitable processing resources for the application. After processing resource allocation, the application may be connected to a remote server with the allocated processing resource, so the application may run with acceleration effect from the processing resource.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of allocating a processing resource to an application, comprising:
- receiving from the application a request for executing a task;
- determining a characteristic of the application based on the request;
- determining stored historical data associated with the application, the historical data comprising at least one of metadata of one or more previous applications and code used by one or more previous applications; and
- automatically selecting, based on the characteristic of the application and the historical data, the processing resource applicable to the application for allocation to the application;
- wherein automatically selecting the processing resource comprises:
- determining, based on the historical data, whether there is stored code that has been determined as being applicable to the application;
- in response to finding the stored code, determining a resource type applicable to the application based on the code; and
- selecting the processing resource based on the resource type;
- in response to receiving code from the application, determining that the received code is executable by the processing resource; and
- in response to determining that the received code is executable by the processing resource, storing the received code in association with the characteristic of the application and the processing resource, as additional historical data;
- wherein storing the received code comprises:
- in response to determining that the received code comprises general-purpose source code, generating a plurality of sets of code applicable to different types of processing resources based on the general-purpose source code; and
- storing the plurality of sets of code;
- the plurality of sets of code providing a dynamic update based on the general-purpose source code in a corresponding iteration.

2. The method according to claim 1, wherein the processing resource is of a first resource type, the method further comprising:
- in response to receiving, from the application, first code specific to a second resource type, converting the first code into second code, the second code being applicable to the first resource type; and
- sending the second code to the processing resource for execution.

3. The method according to claim 1, wherein automatically selecting the processing resource further comprises:
- determining respective performance of available processing resources; and
- automatically selecting the processing resource further based on the respective performance of the available processing resources.

4. The method according to claim 1, wherein the application and the processing resource are positioned remotely to each other.

5. The method according to claim 1, wherein the historical data comprises the code used by one or more previous applications.

6. The method according to claim 1, wherein determining, based on the historical data, whether there is stored code that has been determined as being applicable to the application comprises:
- determining a number of instances of code used by at least one of the one or more previous applications, where said at least one of the one or more previous applications is identical to the application from which the request is received; and
- responsive to the number of instances of code being greater than a threshold, determining that there is stored code that has been determined as being applicable to the application from which the request is received.

7. An electronic device, comprising:
- at least one processing unit; and
- at least one memory coupled to the at least one processing unit and storing instructions executable by the at least one processing unit, the instructions, when executed by the at least one processing unit, causing the electronic device to:
- receive from an application a request for executing a task;
- determine a characteristic of the application based on the request;
- determine stored historical data associated with the application, the historical data comprising at least one of metadata of one or more previous applications and code used by one or more previous applications; and
- automatically select, based on the characteristic of the application and the historical data, the processing resource applicable to the application for allocation to the application;
- wherein automatically selecting the processing resource comprises:
- determining, based on the historical data, whether there is stored code that has been determined as being applicable to the application;
- in response to finding the stored code, determining a resource type applicable to the application based on the code; and
- selecting the processing resource based on the resource type;
- in response to receiving code from the application, determining that the received code is executable by the processing resource; and
- in response to determining that the received code is executable by the processing resource, storing the received code in association with the characteristic of the application and the processing resource, as additional historical data;
- wherein storing the received code comprises:
- in response to determining that the received code comprises general-purpose source code, generating a plurality of sets of code applicable to different types of processing resources based on the general-purpose source code; and
- storing the plurality of sets of code;
- the plurality of sets of code providing a dynamic update based on the general-purpose source code in a corresponding iteration.

8. The electronic device according to claim 7, wherein the processing resource is of a first resource type, and the instructions, when executed by the at least one processing unit, further cause the electronic device to:

in response to receiving, from the application, first code specific to a second resource type, convert the first code into second code, the second code being applicable to the first resource type; and send the second code to the processing resource for execution.

9. The electronic device according to claim 7, wherein automatically selecting the processing resource further comprises:

determining respective performance of available processing resources; and automatically selecting the processing resource further based on the respective performance of the available processing resources.

10. The electronic device according to claim 7, wherein the application and the processing resource are positioned remotely to each other.

11. The electronic device according to claim 7, wherein the historical data comprises the metadata of one or more previous applications.

12. The electronic device according to claim 7, wherein the historical data comprises the code used by one or more previous applications.

13. The electronic device according to claim 7, wherein determining, based on the historical data, whether there is stored code that has been determined as being applicable to the application comprises:

determining a number of instances of code used by at least one of the one or more previous applications, where said at least one of the one or more previous applications is identical to the application from which the request is received; and responsive to the number of instances of code being greater than a threshold, determining that there is stored code that has been determined as being applicable to the application from which the request is received.

14. A computer program product being tangibly stored on a non-transitory computer-readable medium and comprising machine-executable instructions which, when executed, cause a machine to perform the steps of:

receiving from the application a request for executing a task;

determining a characteristic of the application based on the request;

determining stored historical data associated with the application, the historical data comprising at least one of metadata of one or more previous applications and code used by one or more previous applications; and automatically selecting, based on the characteristic of the application and the historical data, the processing resource applicable to the application for allocation to the application;

wherein automatically selecting the processing resource comprises:

determining, based on the historical data, whether there is stored code that has been determined as being applicable to the application;

in response to finding the stored code, determining a resource type applicable to the application based on the code; and selecting the processing resource based on the resource type;

in response to receiving code from the application, determining that the received code is executable by the processing resource; and in response to determining that the received code is executable by the processing resource, storing the received code in association with the characteristic of the application and the processing resource, as additional historical data;

wherein storing the received code comprises:

in response to determining that the received code comprises general-purpose source code, generating a plurality of sets of code applicable to different types of processing resources based on the general-purpose source code; and storing the plurality of sets of code;

the plurality of sets of code providing a dynamic update based on the general-purpose source code in a corresponding iteration.

15. The computer program product according to claim 14, wherein the processing resource is of a first resource type, the method further comprising:

in response to receiving, from the application, first code specific to a second resource type, converting the first code into second code, the second code being applicable to the first resource type; and sending the second code to the processing resource for execution.

16. The computer program product according to claim 14, wherein automatically selecting the processing resource further comprises:

determining respective performance of available processing resources; and automatically selecting the processing resource further based on the respective performance of the available processing resources.

17. The computer program product according to claim 14, wherein the application and the processing resource are positioned remotely to each other.

18. The computer program product according to claim 14, wherein the historical data comprises the metadata of one or more previous applications.

19. The computer program product according to claim 14, wherein the historical data comprises the code used by one or more previous applications.

20. The computer program product according to claim 14, wherein determining, based on the historical data, whether there is stored code that has been determined as being applicable to the application comprises:

determining a number of instances of code used by at least one of the one or more previous applications, where said at least one of the one or more previous applications is identical to the application from which the request is received; and responsive to the number of instances of code being greater than a threshold, determining that there is stored code that has been determined as being applicable to the application from which the request is received.

* * * * *